May 2, 1939.　　　L. W. STETTNER　　　2,156,823
GAS PRESSURE REGULATOR
Filed May 21, 1937
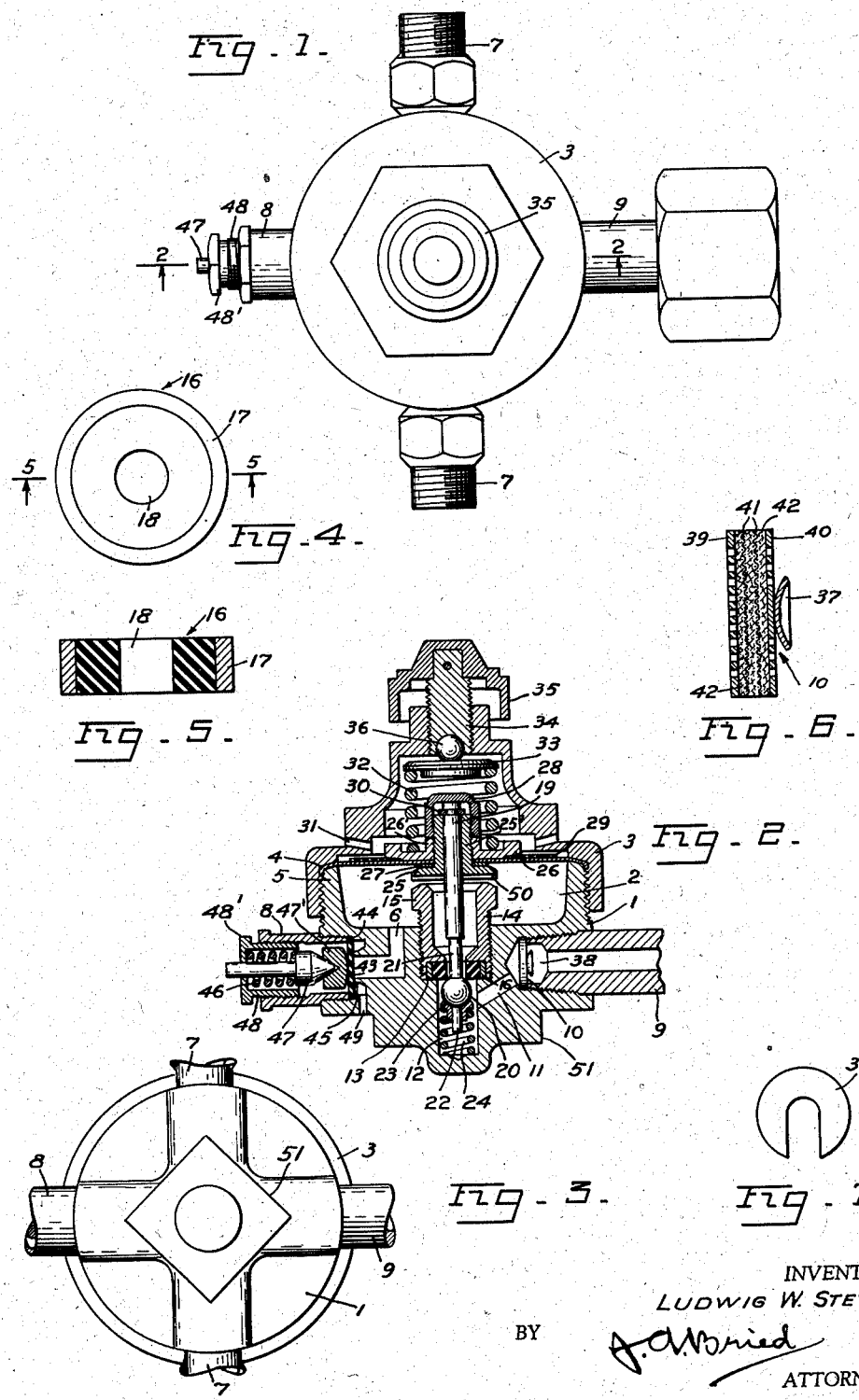
INVENTOR.
LUDWIG W. STETTNER
BY
ATTORNEY.

Patented May 2, 1939

2,156,823

UNITED STATES PATENT OFFICE 2,156,823

GAS PRESSURE REGULATOR

Ludwig W. Stettner, Oakland, Calif., assignor to Victor Equipment Co., San Francisco, Calif., a corporation of Delaware Application May 21, 1937, Serial No. 143,981

1 Claim. (Cl. 50—23)

This invention relates to gas pressure regulators of the type used for reducing and regulating the pressure of welding and cutting gases, and the principal objects of the invention are to provide improvements in the construction of such regulators which result in a more simple, accessible, efficient, safe and dependable regulator than prior gas pressure regulators of this type.

Specific features and advantages of the invention will appear in the following description and accompanying drawing.

In the drawing:

Figure 1 is a top view of my improved regulator shown full size as used for ordinary welding purposes, though it may be any size to suit any gas pressure and volume requirements.

Figure 2 is a vertical section of the regulator as seen from the line 2—2 of Figure 1.

Figure 3 is a bottom view of the regulator.

Figure 4 is an enlarged plan view of the reversible valve seat.

Figure 5 is a cross section of the valve seat taken along the line 5—5 of Figure 4.

Figure 6 is an enlarged cross section of the combined inlet deflector and gas strainer.

Figure 7 is an enlarged plan view of the lock washer which locks the outer end of the valve stem to the diaphragm nut.

In further detail 1 is the body of the regulator of solid metal formed with a circular low-pressure chamber 2 threaded exteriorly and covered by a bonnet 3 which clamps a thin metal diaphragm 4 down over the slightly beveled upper edge of the low pressure chamber wall 5.

Leading downwardly and radially from the low pressure chamber are several L-shaped passages as at 6, some of which are fitted with hose or pipe connecting nipples 7, 7, for delivering the low pressure gas to the torches or other use, and one other of which passages is provided with a relief valve 8 which will later be more freely described.

At some intermediate point on the diameter of the body is a high-pressure inlet port here shown with an inlet pipe connecting nipple 9 screwed in place and abutting at its inner end a combined deflector and straining member 10. At the inner end of the inlet port is a downwardly slanted extension inlet port 11 which opens to a vertical central bore 12 which is counterbored at its upper end to provide a flat shoulder at 13, for a reversible valve seat 16.

The enlarged upper or counterbored portion of bore 12 is threaded to receive an externally threaded tubular nut or valve cage 14 which extends up into the low pressure chamber and is provided with wrench faces at 15. Valve cage 14 is recessed at its lower end to receive a disk valve seat assembly shown best in Figures 4 and 5, and wherein the seat is a centrally apertured relatively thick, flat disk 16 of a slightly yielding material such as hard rubber, fiber or other suitable material tightly forced into a metal band 17.

The hole 18 in the valve seat is of a size to pass the elongated valve stem 19 which is formed or fitted with a spherical valve 20 near its lower end and the diameter of the stem is reduced for a distance above the valve 20 as at 21 to permit free passage of gas around it through hole 18 and also to give the spherical valve freedom for perfect seating against the lower edge of the hole. The valve stem continues in reduced diameter below the valve 20 as at 22 and is provided with a loose shouldered collar 23 which centers a light compression spiral spring 24 which normally urges the valve upward to closed position.

The diaphragm 4 is centrally apertured, and clamped against it from opposite sides is a pair of tubular hubbed flanges 25, 26, the tubular hubs of the flanges being threaded and screwed one into the other as indicated and with a gasket 27 interposed between the lower flange and the under side of the diaphragm. The threaded hub 25' of flange 25 projects above the threaded hub 26' of flange 26 and is surmounted by an inverted cup-like member 28 which screws over it and fits gas-tight at its lower edge against the upper edge of hub 26'.

Flange 26 seats against the central portion of the diaphragm but at its edges is tapered away from the diaphragm to overlap and impinge the inner margins of a soft rubber stabilizing washer 29 which is almost as large in outer diameter as the low pressure chamber.

Valve stem 19 extends smoothly through a central bore in flange hub 25' and is normally retained with slight upward tension of the diaphragm upon it by means of a slotted lock washer 30 which engages into a groove cut around the valve stem near its upper end. Inverted cup member 28 is also provided exteriorly with wrench faces and when screwed down over flange hub 25' just touches or slightly clears the upper end of the valve stem, while seating gas tight against the flange hub.

Bonnet 3 is vented to atmosphere as at 31, and within it is a heavy spiral compression spring 32 bearing at its lower end against upper flange 26 and surmounted on its upper end by a centering follower 33 which may be forced down by a screw 34 provided with an inverted cup-shaped thumb nut 35, a steel ball 36 being interposed between the lower end of the screw and the follower to reduce the friction at that point of pressure.

To reduce the tendency of freezing at point of inlet of the high pressure gas I provide the assembly 10 (see Figure 6 for details) and which includes a concave deflector 37 positioned in an enlarged chamber 38 formed at the inner end of the inlet nipple 9 and directed toward the incoming high pressure gas stream, and a series of scattering screens to break the direct impact of the gas. The screens include two relatively thick perforated outer disks 39, 40, to the latter of which the deflector is secured as by soldering or riveting, and intermediate the perforated disks are two or more disks 41 of fine woven wire cloth and three or more disks of soft felt 42. In time this assembly may gather foreign matter if any should be in the incoming gas, but if so the assembly may easily be discarded by unscrewing nipple 9 and inserting a fresh assembly.

In case valve 20 should ever fail to seat absolutely tight and permit an unsafe pressure to be slowly built up in the low pressure chamber, relief valve 8 will take care of the excess. This is shown as a disk 43 of slightly flexible material such as hard rubber, forced to seat at its margins against an annular shoulder 44 by outer threaded tubular member 8 and centrally urged against an annular lip 45 formed on the outer end of passage 6, the degree of pressure against the lip being controlled by a spiral compression spring 46 acting against a plunger 47 in turn pressing against a block 47' slightly rounded on its inner face where it contacts the disk 43. Spring 46 reacts at its outer end against the end of a tubular nut 48 threaded into member 8 to provide adjustment of the spring pressure to any desired degree. Nut 48 is formed with tight-fitting threads to prevent accidental turning, and with suitable wrench faces at 48'. When disk 43 is lifted slightly from its seat by excess pressure, the gas escapes through one or more side passages 49.

In the normal position of the parts of the regulator as shown in Figure 2 with diaphragm horizontal, flange 25 is quite close to member 15 which forms a limit stop against excessive inward flexing of the diaphragm, and the lower surface of flange 25 is therefore cross grooved as at 50 to provide for escape of gas when touching valve cage member 15.

In considering the construction above set out, it should be noted that the diaphragm, its controlling spring, valve, valve cage, valve seat, and valve spring 24, may all be removed, or replaced from above, upon unscrewing the bonnet, and that there is no removable portion or closure at the under side of the body, but that the under side is solid, and is provided at 51 with a solid square shoulder for firm gripping in a vise while assembling or adjusting the parts, though this may be readily done without unscrewing any of its piping if the regulator is already installed.

To disassemble the structure shown in Figure 2, the bonnet 3 is first unscrewed, spring 32 lifted out, thimble 28 unscrewed, lock washer 30 slipped out laterally from groove in valve stem, diaphragm 4 and its flanges lifted off, cage 15 unscrewed and valve stem lifted out bringing the cage and valve seat 16 along with it, and after which spring 24 and follower 23 may be either dumped out, or lifted out with a small pair of pliers. In reassembling, the valve and its follower and spring are more easily inserted if the body is inverted.

The whole operation of disassembling and reassembling can be done in a few moment's time without the use of special tools.

In operation this simplified gas regulator functions like any single stage gas pressure regulator of the spring diaphragm controlled type to automatically hold the low pressure at any required point, with the exception that the valve stem being locked to the diaphragm assembly, insures positive movement of the valve with every movement of the diaphragm. The extreme accessibility of the improved construction permits reversing the valve seat or examination of the valve and other parts quickly and with but little effort, and by deflecting and scattering the incoming high pressure gas in the manner set out, freezing through localized impingement of the gases is substantially overcome.

Having thus described my improved construction in a gas pressure regulator, what I claim is:

In a gas pressure regulator of the character described having a high pressure inlet, a low pressure chamber closed on one side by a flexible disk diaphragm and a valve controlling a passageway from said inlet to said low pressure chamber, a tubular hub secured centrally through said diaphragm, a tubular member screwed from the low pressure chamber into the passageway from the bottom of said chamber providing a seat for said valve between it and said chamber, a stem extending from said valve through said tubular member and through said diaphragm and hub, means detachably securing said stem at the outer end of said hub consisting of a U-shaped lock washer engaging a groove across the stem and seated against the outer end of the hub, and means sealing the stem against the leakage of gas consisting of a cap screwed to the outer end of the hub covering said stem and lock washer.

LUDWIG W. STETTNER.